United States Patent [19]

Herbert

[11] 3,904,257
[45] Sept. 9, 1975

[54] PLAIN BEARINGS
[75] Inventor: Colin Wray Herbert, Tees-Side, England
[73] Assignee: The Glacier Metal Company Limited, Wembley, England
[22] Filed: Feb. 11, 1974
[21] Appl. No.: 441,220

[30] Foreign Application Priority Data
Feb. 16, 1973 United Kingdom............... 7651/73

[52] U.S. Cl..................... 308/237 R; 308/DIG. 12
[51] Int. Cl.² ........................................ F16C 23/00
[58] Field of Search...... 308/237 R, 237 A, DIG. 12

[56] References Cited
UNITED STATES PATENTS
2,562,624   7/1951   Loofbourrow............... 308/DIG. 12
3,022,126   2/1962   Siebert........................... 308/237 R Primary Examiner—M. Henson Wood, Jr.
Assistant Examiner—Gene A. Church
Attorney, Agent, or Firm—Pierce, Scheffler & Parker

[57] ABSTRACT

This invention is a plain journal bearing for a ship's propellor, and instead of having a housing with a white metal lining cast and shaped within it, the bearing surface is defined by a pair of removable plastics-compound half-cylindrical shells. The shells are not permanently secured in the housing but are keyed in position by wedge bars which are slid axially into the housing against the edges of the shells; which are thus easily removed for service or replacement merely by sliding the bars out leaving the housing and shaft in position.

7 Claims, 4 Drawing Figures

FIG.1

PLAIN BEARINGS

The present invention relates to plain journal bearings and one object to provide a bearing having a shell defining the bearing surface, which is easily removable from, and replacable in, its housing. The invention is applicable to large bearings such as are employed in the stern frame of ships for the propellor.

According to the present invention one or more bearing shells are secured in a housing by a wedgelike bar member inserted between the shell edges to push the shells lightly apart and outwards against the housing. Assembly and removal of the shells are simply by axial movement of the bar.

In a preferred embodiment of the invention, the wedgelike member is constrained by a slot in the internal wall of the housing in which it slides.

The abutting edges of the shells are preferably tapered or chamfered axially and radially to provide slopes such that, when the bar is inserted, correspondingly sloped edges of the bar mate with the slopes of the shell edges lifting the shells slightly upwards and outwards to press them uniformly against the internal wall of the housing.

To facilitate assembly, the wedgelike members, which are normally approximately the same length as the axial width of the shells, are slightly inclined over their entire length and adapted to slide through correspondingly inclined slots in the housing. The edges of the shell may be correspondingly inclined also. The slots have guide faces on which the wedgelike members slide and by which the member is constrained.

Oil holes located in the wedgelike member provide a means through which lubrication oil may be directed to the shaft and inner surface of the bearing.

A specific embodiment of the invention will now be described, by way of example only, with reference to the accompanying drawings in which:

FIG. 4 is a perspective view of a wedge bar and the surfaces it acts on.

Figure 1:
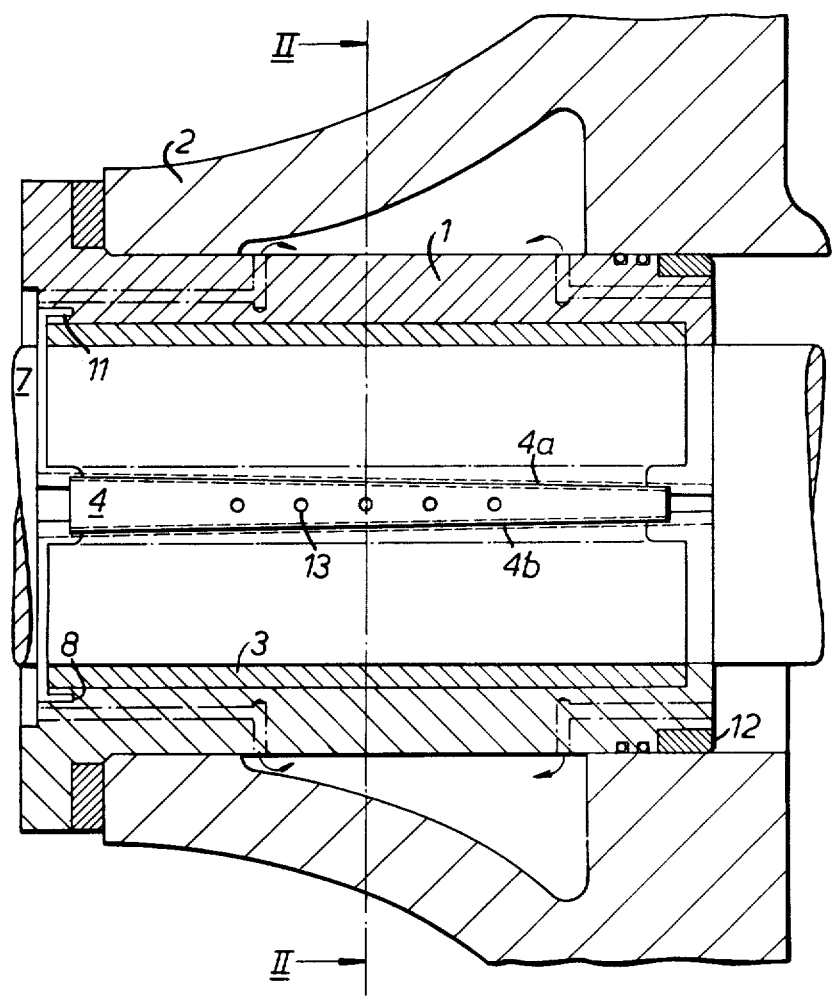
FIG. 1 is a vertical axial section through the bearing area of a ship's sternframe structure.
Figure 2:
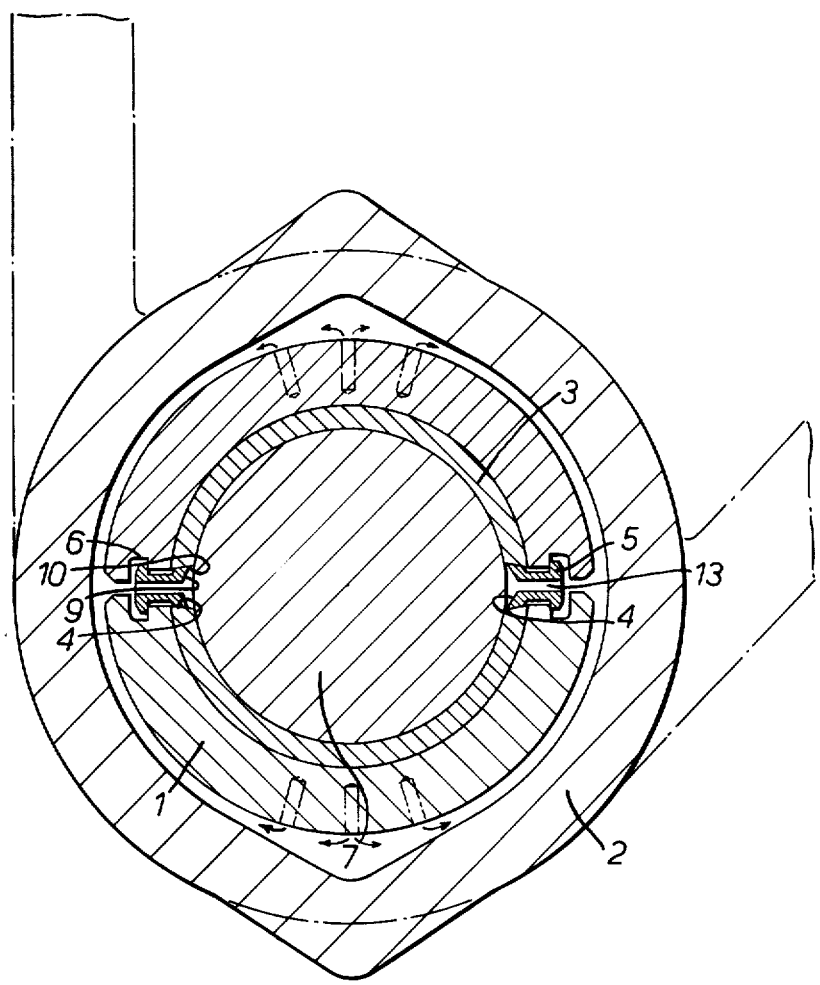
FIG. 2 is a cross-section on the line II—II of FIG. 1.

A steel bearing housing 1 is fitted and sealed in the sternframe 2 of a ship and is adapted to support two half-cylindrical bearing shells 3 defining the bearing surface in which the ship's propellor shaft 7 rotates.

The bearing housing 1 may be a complete cylindrical shell, or may consist of two half cylinders which can be separated to receive the shells. In the latter case, a solid ring 12 fitted around the half cylinders to consolidate the complete housing.

The bearing shells 3 are of phenolic or cresolic resin reinforced with asbestos fibres and are formed to fit the housing at their outer cylindrical surfaces, to fit the shaft 7 at their inner cylindrical surfaces and to have tapered surfaces 9 at their edges so that a wedge-shaped gap is left between the facing edges, one on each shell, at each side of the bearing.

The shells are secured in position in the housing by means of elongate wedge bars 4 which are driven axially into the gaps.

The section of the bars 4 includes a spacer 20 with sides 10 corresponding to the surfaces 9 of the shells, a head 21 which slides in an axial slot 6 in the housing, and a neck 22 joining the spacer 20 to the head 21. The head 21 and slot 6 have co-operating flat faces 5 locating the bars 4 radially.

The surfaces 9 and 10 at the edges of the shells and the sides of the spacers 20 are machined to be flat, but to taper both radially inwardly and circumferentially towards one another as they extend axially. Thus when the wedge bars are forced axially into the gaps, the shells are forced away from one another and radially outwards to establish a more or less uniform pressure between the inner cylindrical surface of the housing 31 and the outer corresponding surfaces of the shells 3.

The bearing shells are located in the housing by a nick 8, FIG. 1, formed on the bearing shell and adapted to fit a recess in the housing.

Figure 4:
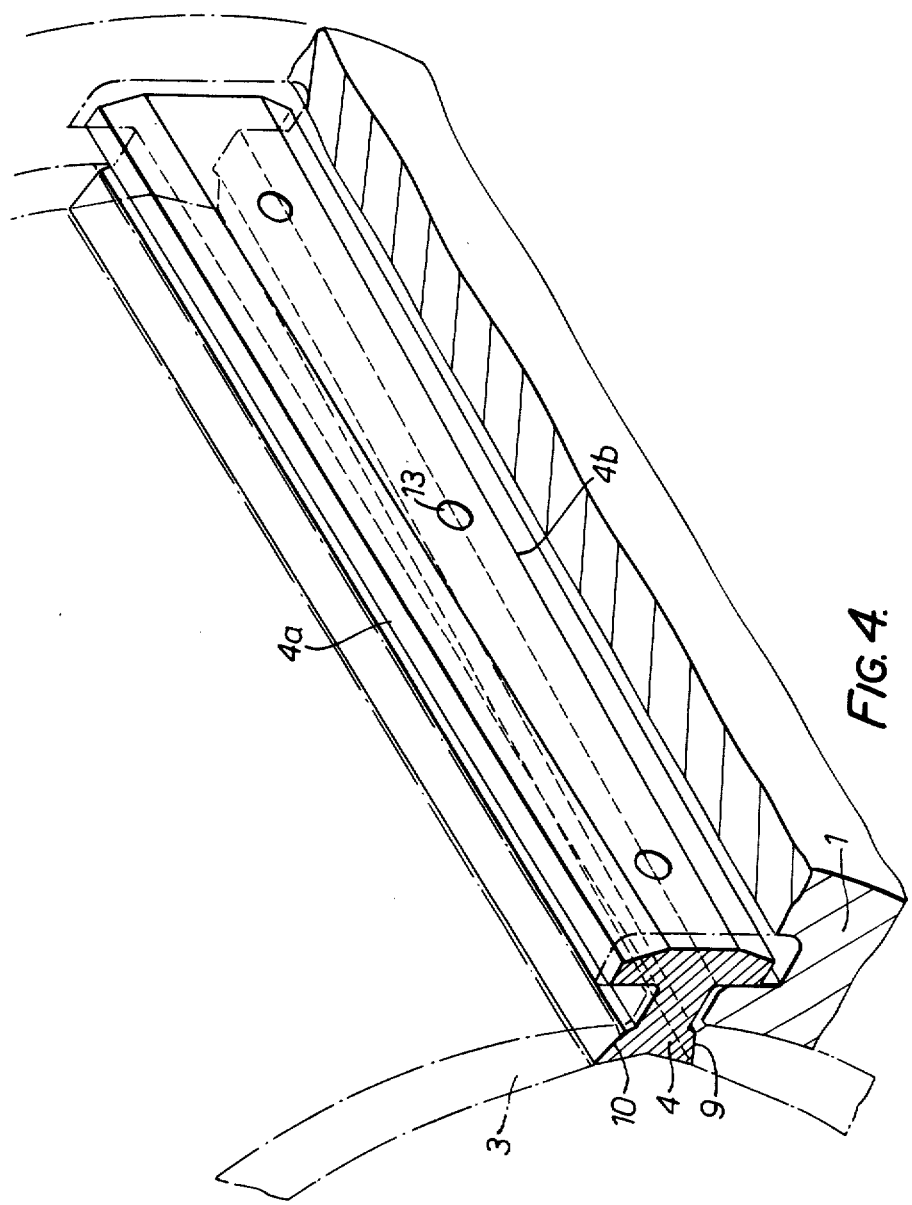

FIG. 4 shows that the sides 4a and 4b of the head also taper along the length of the bar. The slot 6 tapers in the same way, having a section consisting of a neck leading to larger space for the head 21.

Figure 3:
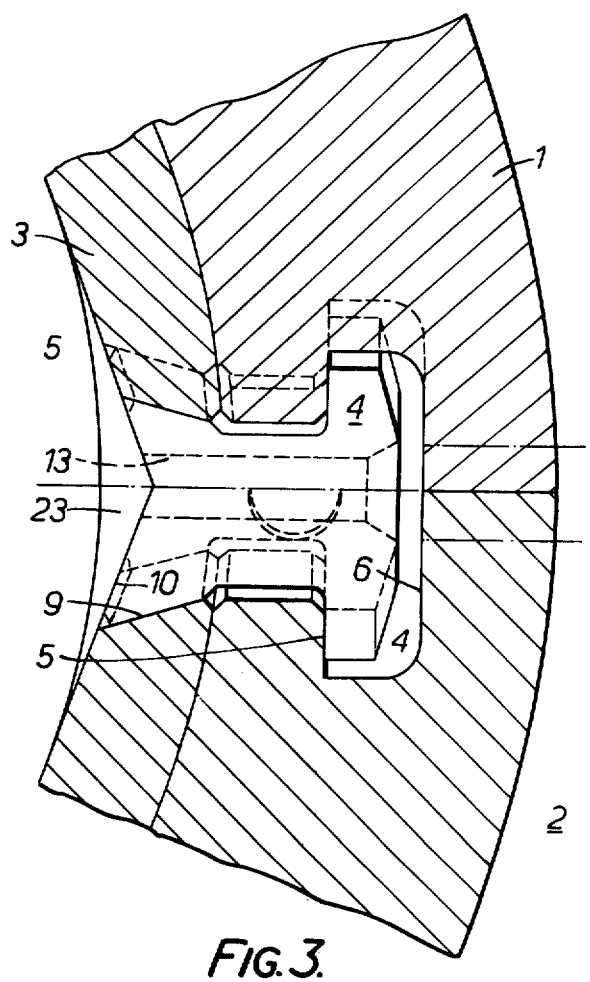
FIG. 3 is a detail to an increased scale of a part of FIG. 2.

When the housing 1 is in position, the shells 3 are slid into position axially from an accessible end of the housing, the shaft being temporarily supported, if necessary, and are located by an external projection 8 engaging in a corresponding recess in the housing. Keys 11 locate the shells angularly so that the edges are correctly positioned relative to the slots 6. The wedge bars 4 are then fitted and axially loaded by bolts or hydraulic loading jacks to be forced into the gaps and slots to secure the shells in position. The inclined faces 9 and 10 force the shell into position while the faces 5 locate the bars 4 radially. Oil is fed to the propellor shaft through holes 13 disposed uniformly along the length of the wedge bars. FIG. 3 shows an oil distribution space 23 at the inner end of the bar 4 and shows how the shells 3 are chamfered at either side of that space to assist oil distribtuion over the bearing surface.

FIG. 3 also shows how the bar, shell, and slot surfaces taper.

To dismatle the bearing, the wedges are removed by reversal of the load applied in assembling and the shells are withdrawn for repair or replacement.

The outer diameter of the shells may be made slightly smaller than the bore of the housing, the shells being sufficiently flexible to allow them to expand slightly to take up slight inaccuracy in the housing.

What we claim as our invention and desire to secure by Letters Patent is:

1. A journal bearing suitable for a ship's propellor, comprising a housing, at least one part-cylindrical shell defining a bearing surface for the shaft, and separable from the housing, and keying means holding the shells located in the housing and capable of movement to release the shells to enable them to be withdrawn from the housing and shaft, said keying means comprising at least one elongate bar capable of being slid axially in relation to the edge of a shell to force the shell against the housing, and capable of axial withdrawal to release the shell.

2. A bearing as claimed in claim 1 in which the, or each, bar is of tapered or wedge form to force the shell against the housing as the bar is slid axially.

3. A journal bearing comprising a housing and at least one part-cylindrical shell defining a journal bearing surface and separable from the housing, and at least one wedge bar mounted for axial movement in relation to the edge of a shell and in relation to the housing to force the shell against the housing by a wedging action, and capable of movement in the opposite direction to release the shell.

4. A bearing as claimed in claim 3 in which the shell has an edge with a taper corresponding to that of the bar.

5. A bearing as claimed in claim 3 in which the housing is formed with an axial slot for the, or each, baar which bar has a head for sliding in the slot connected to a keying portion for acting on the shell.

6. A bearing as claimed in claim 5 in which the key or bar has an axis inclined to the axis of the bearing.

7. A bearing as claimed in claim 3 in which the key or bar has oil distribution holes leading to the bearing surface.

* * * * *